United States Patent [19]

Goel et al.

[11] Patent Number: 4,698,408

[45] Date of Patent: Oct. 6, 1987

[54] SAG RESISTANT TWO-COMPONENT URETHANE ADHESIVES WITH IMPROVED THERMAL STABILITY

[75] Inventors: Anil B. Goel, Worthington; Harvey J. Richards, Columbus, both of Ohio

[73] Assignee: Ashland Oil, Inc., Ashland, Ky.

[21] Appl. No.: 887,482

[22] Filed: Jul. 21, 1986

[51] Int. Cl.$^4$ .............................................. C08G 18/00
[52] U.S. Cl. ...................................... 528/48; 427/386; 528/52; 528/53; 528/57; 528/60; 528/55; 528/66
[58] Field of Search ....................... 528/48, 52, 53, 57, 528/58, 60, 65, 66; 427/386

[56] References Cited

U.S. PATENT DOCUMENTS 4,613,660 9/1986 Goel et al. ............................ 528/73

Primary Examiner—Maurice J. Welsh
Attorney, Agent, or Firm—John F. Jones

[57] ABSTRACT

An adhesive comprising a mixture of (A) a mixture of an isocyanate prepolymer and a polyepoxide which is essentially free of hydroxyl groups, and (B) a mixture of a polyol, a urethane catalyst and an epoxy curing catalyst and structures prepared by adhering substrates to one another by means of said adhesive are described.

13 Claims, No Drawings

SAG RESISTANT TWO-COMPONENT URETHANE ADHESIVES WITH IMPROVED THERMAL STABILITY

This invention relates to two component adhesives in which each component has gravity flow character comprising a first component composed of an isocyanate prepolymer and a polyepoxide resin and a second component composed of a curative comprising a mixture of polyols, a di- or tri-primary or secondary amine, a urethane and/or isocyanurate catalyst and an epoxide curing catalyst and to a process for the preparation and cure of said adhesives.

Two component urethane adhesives are well known in the art (U.S. Pats. Nos. 3,714,127; 3,812,003; 3,886,122; 3,935,051; and 4,444,976, for instance) and are widely used to adhere substrates such as plastic adherends together. The choice of urethane adhesives over other adhesives is based in part upon their outstanding characteristics with respect to bond strengths, flexibility, chemical inertness, and the like. Such prior art urethane adhesives are also known to have poor resistance to elevated temperatures (approximately 400 degrees F.). Two component urethane adhesives having nonsag (do not flow or drip) properties when applied to vertical surfaces plus high heat resistance have not been disclosed previously in the prior art. The present invention is an improvement over copending U.S. Pat. Application Ser. No. 702,706 filed 02/19/85 now U.S. 4,513,660. The improvements include increased shelf stability of the two components, excellent sag resistance developed immediately upon mixing the two components and these and other improvements are accomplished by including urethane/isocyanurate and epoxy curing catalysts in the curative component.

The choice of urethane adhesives over other classes of adhesives based on the outstanding flexibility, bond strength, chemical inertness, etc. of the former. Some of these urethane compositions and their use in two-component adhesives are reported in the above cited U.S. Pats. Generally speaking, conventional polyurethane-based adhesives are gravity flowable, highly viscous two-component systems wherein one component is composed of an isocyanate prepolymer and the second component consists of an admixture of a polyhydroxy compound free of isocyanate groups, small amounts of di- or tri-primary or secondary amines and selected urethane catalysts. The polyurethane adhesives formed by blending the above two components provide the nonsag property by the inital immediate reaction of polyisocyanate with polyamine followed by the curing of polyols with polyisocyanate. The conventional adhesives based on the above polymerization reactions are known to have poor high heat resistance and usually suffer loss of adhesion after high temperature exposures near 400 degrees F. for 30 minutes or more. Because some of the adhesive operations such as in automotive assembly of fiberglass reinforced plastics, require high heat resistance, prior art urethane adhesives have been found to be unsuitable for such high temperature applications.

It is a primary objective of this invention to provide an improved polyurethane based adhesive having significantly improved thermal stability (high heat resistance) in addition to the other desired properties such as (1) gravity flow in each of the two components with good shelf stability in each, (2) an immediate nonsagging behavior particularly on vertical surfaces upon blending of the two components, (3) noncritical mix ratio (ratio overlap tolerance in mixing of the two components), (4) flexibility to avoid any possible readout in the adhered fiber reinforced plastic parts, (5) reasonable room temperature open time (pot life) and fast cure time at moderatley elevated temperatures for the adhesive mixture and (6) high peel and lap shear bond strengths for the adhesive after it is applied to substrates and the samples are cured.

We have developed two-component, polyurethane-based adhesive compositions which satisfy all of the above listed properties. The two-component adhesive system of this invention comprises (A) a first component comprising a gravity flowable isocyanate prepolymer obtained by the reaction of a small amount of poly (alkylene oxide) diol with an excess on an equivalent basis (more that two equivalents of NCO per hydroxy group) of a plyisocyanate and blended with small amounts (2 to 30% by weight based on the weight of the prepolymer) of essentially hydroxy group free diepoxide resin and their prepolymers and this component optionally may be filled with fillers such as talc, kaolin, aluminum oxide, silica, metals and metal oxides, etc. and (B) a stable gravity flowable curative second component comprising a mixture of a polyol (preferably a polyether polyol or polyester polyol) and small amounts (0.2 to 5 weight percent) of di- or tri-primary or secondary amine group containing molecule along with a urethane catalyst and an epoxy-curing catalyst and the curative may optionally be filled with fillers such as talc, silica, kaolin, aluminum oxide, metal oxides and metals. The preferred urethane catalysts include tertiary amines such as triethylene diamine, N,N',N''-tris-(dimethylaminopropyl) hexahydrotriazine, organotin catalysts such as dibutyltin dicarboxylates, stannous octoate and the like, potassium octoate, iron acetyl acetonate, zinc octoate, nickel acetyl acetonate and the like and mixtures thereof. The epoxy curing catalysts include tertiary amines, imidazoline, onium salts such as tetra alkyl ammonium halides, titanates, boron trifluoride-amine complexes, lithium chloride, and phenolics and the like and mixtures thereof. The amounts of each of such urethane and epoxy-curing catalysts used depends on the desired open time and the cure time requirements and may be from 0.05 to 8% by weight of the curative component.

The polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., ether radicals, halogen atoms, and the like.

Typical epoxy compounds suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

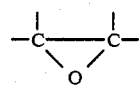

The 1,2-expoide groups may be either terminal or inner ones. Particularly suitable terminal 1,2-epoxide groups are 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring. As epoxy compounds containing an inner 1,2-epoxy group there are suitable epoxidized diolefins, dienes, or cyclic dienes, such as 1, 2, 5, 6-diepoxy hexane, 1, 2, 4, 5,-diepoxy cyclohexane, dicyclopentadiene diepoxide, dipentene diepoxide, vinyl cyclohexane diepoxide, epoxidized diolefinically unsaturated carboxylic acid esters, such as methyl-9, 10, 12, 13-diepoxy stearate or the dimethyl ester of 6, 7, 10, 11-diepoxyhexadecane-1,16-dicarboxylic acid. Furthermore, there may be mentioned epoxidized mono- di, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 1,4-disocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

The polyols useful in this invention include those having at least two hydroxyl groups per molecule and having equivalent weights falling in the range of from 30 to 5000. Specific polyols include butane diol, cyclohexane dimethanol, tripropylene glycol, amide diols, urethane diols, polyether polyols such as poly (tetramethylene ether) diols, poly (propylene ether) polyols, polyester polyols, and the like.

Polyhydroxy polyethers are suitable and preferably those having at least 2 hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials such as ethylene glycol, propylene glycol, trimethylol propanes and 4,4'-dihydroxy diphenyl propane. Sucrose polyethers also may be used. Polybutadienes having hydroxyl groups as well as other known hydroxyl containing vinyl addition polymerized polymers can be used.

According to the present invention, hydroxyl containing polyesters, polythioethers, polyacetals, polycarbonates or polyesteramides of the types known for the formation of polyurethanes may also be used.

The primary or secondary di- or tri-amines used for the rapid thixotrophy build up to give the non-sag behavior in the mixed adhesive include those conforming to the formula $H_2NRNH_2$ (where R is a hydrocarbon or hydrocarbon ether group having from 2 to 50 carbon atoms) such as ethylene diamine and the like and piperazine and its derivatives such as amino ethyl piperazine and the like.

Additives such as plasticizers, antioxidants, colorants, pigments and the like may be included in either or both of the components.

The adhesive compositions of this invention involving the two gravity flow components exhibit excellent adhesion to a wide variety of substrates including fiberglass reinforced plastic, metal, wood and the like and combinations thereof, and the adhesive bonds withstand high heat bake cycles of around 400 degrees F. for a period of one hour or more. The two components, (A) and (B) may be mixed to form an adhesive in such a manner that the total isocyanate funcionality to the combined hydroxy and epoxy functionality of the ingredients are in the equivalent ratio of 0.8:1 to 3:1, preferably 0.9:1 to 0.5:1.

This invention is further illustrated in the following representative examples.

EXAMPLE 1

An isocyanate prepolymer having long shelf life of about six months or more was prepared by mixing 118 g of liquid methylene bis (phenyl isocyanate) (NCO equivalent weight of 144) at 80 degrees C. with 321.1 g of a mixture obtained by blending 59 g of ethylene oxide capped poly (propylene oxide) diol (hydroxy equivalent weight of 500), 28.3 g of liquid diglycidyl ether of Bisphenol-A (epoxy equivalent weight 180-190) and 62.3 g of Kaophile (alumina treated kaolin) filler. The prepolymer was found to have about 11.7% by weight NCO groups.

EXAMPLE 2

An isocyanate prepolymer was prepared by reacting 43.7 parts by weight of 2000 molecular weight poly (propylene oxide) diol capped with ethylene oxide with 132.5 parts by weight of oligomeric methylene bis (phenyl isocyanate) (NCO functionality of 2.7) followed by mixing with 23.7 parts by weight of liquid methylene bis (phenyl isocyanate) (NCO functionality of 2.1) and 23.8 parts by weight of dry talc filler. This isocyanate prepolymer was mixed with 20% by weight of liquid glycidyl ether of Bisphenol-A and 5% by weight of talc.

EXAMPLE 3

A curative component was prepared by reacting 53 parts by weight of poly(propylene oxide) tetraol (hydroxy equivalent weight 450) and 28.6 parts by weight of ethylene oxide capped poly(propylene oxide) tetraol (hydroxy number 453) with 1.96 parts by weight of toluene diisocyanate followed by mixing with 5.3 parts by weight of Aerosil 200 (fuma silica) 1.51 parts by weight of piperazine, 0.4 parts by weight of triethylene diamine and 2 parts by weight of boron trifluoride-ethylamine complex.

EXAMPLE 4

A curative component was prepared by reacting 53 parts by weight of poly(propylene oxide) triol capped with ethylene oxide (hydroxy equivalent weight of 1167) with 2.95 parts by weight of toluene diisocyanate followed by mixing with 34.76 parts by weight of ethylene oxide capped poly(propylene oxide) tetraol (hydroxy equivalent weight 450). The resulting mixture was filled with 41.8 parts by weight of dry kaolin filler and mixed with 0.12 parts by weight of iron (III) acetonyl acetonate, 0.064 parts by weight of stannous octoate and 1.54 parts by weight of piperazine.

EXAMPLE 5

A curative component was prepared by mixing 0.6% by weight of methyl trialkyl ($C_8$–$C_{10}$) ammonium chloride catalyst (Adogen 464 from Sherex Chemical Company, Inc.) with the curative of Example 4.

EXAMPLE 6

The following is the general procedure followed for preparing the adhesives and the adhesive bonds used throughout the following Examples. The two components were mixed in appropriate weight amounts under an inert atmosphere (nitrogen) at room temperature. The resulting adhesive mixture was applied to the substrate in the form of a ⅜ inch bead across the substrate SMC (sheet molding compound laminates which measured 12 inches by 4 inches by 100 mils). The substrate was first wiped clean with a dry rag or with a rag containing methylene chloride. After sprinkling a few 30 mils diameter glass beads on the top of the adhesive to get a final glue line thickness of 30 mils, the other laminate sheet was placed on top of the first with a one-inch overlap. The samples were kept at room temperature under contact pressure until the adhesive had gelled, (usually in from 10 to 60 minutes) and then were placed in an oven at 285 degrees F. for postponcuring for 30 minutes. Test specimens were cut from these cured samples into one-inch wide strips.

The following tests were carried out by using a set of at least three samples for each type of test:

(A) Shear strength test at room temperature (B) Postbaked at 400 degrees F. for an additional hour and tested shear strength at room temperature (C) Postbaked at 400 degrees F. for one hour and tested shear strength at 180 degrees F.

(D) Shear strength at room temperature after immersion for 24 hours in 206 degrees F. water (E) Shear strength at 130 degrees F. after 7 days immersed in water at 130 degrees F.

(F) Shear strength at 130 degrees F. after 400 degrees F. postbaked (1 hour), samples immersed in 130 degrees F. water for seven days.

EXAMPLE 7

The prepolymer of Example 1 (23.5 g) and the curative of Example 5 (25.2 g) were mixed for about one minute to give a nonsagging adhesive mixture. This mixture was applied on a fiberglass reinforced plastic panel (fiberglass reinforced polyester, Phase Alpha SMC from Ashland Chemical Company) by following the general bonding procedure of Example 6. The lap shear bond test results, which show good adhesion even after the 400 degrees F. for 1 hour postbake cycle, are given in Table 1.

TABLE 1

| SAMPLE NUMBER | TEST PROCEDURE | LAP SHEAR STRENGTH (PSI) |
|---|---|---|
| 1 | A | 475 DL* |
| 2 | A | 450 DL |
| 3 | A | 460 DL |
| 4 | B | 340 SB** |
| 5 | B | 440 SB |
| 6 | B | 275 SB |
| 7 | D | 455 DL |
| 8 | D | 225 SB |
| 9 | D | 290 SB |

*DL means delamination of the substrate occurred.
**SB means substrate broke.

EXAMPLE 8

The prepolymer of Example 1 (25 g) was mixed with the curative of Example 4 (25 g) to give a nonsagging adhesive paste. The paste was applied to unprimed SMC from Rockwell (RW 9468) and the cured adhesive bonds were tested. The results, which clearly show good adhesion even after the most severe tests, are summarized in Table 2.

TABLE 2

| SAMPLE NUMBER | TEST PROCEDURE | LAP SHEAR STRENGTH (PSI) |
|---|---|---|
| 1 | A | 595 DL |
| 2 | A | 548 DL |
| 3 | A | 510 DL |
| 4 | A | 490 DL |
| 5 | B | 442 DL |
| 6 | B | 512 DL |
| 7 | B | 348 DL |
| 8 | B | 532 DL |
| 9 | B | 485 DL |
| 10 | C | 460 DL |
| 11 | C | 452 DL |
| 12 | C | 395 DL |
| 13 | C | 388 FT* |
| 14 | F | 318 DL |
| 15 | F | 228 DL |
| 16 | F | 292 DL |
| 17 | F | 315 DL |
| 18 | F | 235 DL |

*FT means surface fiber tear in substrate.

EXAMPLE 9

The prepolymer component of Example 2 (40 g) and the curative component of Example 3 (10 g) were mixed to give a nonsagging adhesive paste [weight ratio of first (prepolymer) component to second (curative) component of 4:1] which was applied on Diversitech General SMC (GT 7113) and bonded according to the procedure of Example 6. Similarly 60 g of the prepolymer of Example 2 were mixed with 10 g of the curative of Example 3 (ratio of 6:1) and tested as an adhesive. The results of these tests are given in Table 3.

TABLE 3

| | | Lap Shear Strength (psi) | |
|---|---|---|---|
| Sample No. | Test Procedure | 4/1 Ratio | 6/1 Ratio |
| 1 | A | 1,000 DL | 880 DL |
| 2 | A | 960 DL | 650 DL |
| 3 | A | 1,000 DL | 480 DL |
| 4 | B | 690 DL | 660 DL |
| 5 | B | 550 DL | 585 DL |
| 6 | B | 660 DL | 655 DL |
| 7 | E | 670 DL | 640 DL |
| 8 | E | 675 DL | 645 DL |

TABLE 3-continued

| | | Lap Shear Strength (psi) | |
|---|---|---|---|
| Sample No. | Test Procedure | 4/1 Ratio | 6/1 Ratio |
| 9 | E | 620 DL | 530 DL |

We claim:

1. An adhesive comprising a mixture of
   (A) A mixture of an isocyanate prepolymer and a polyepoxide which is essentially free of hydroxyl groups, and
   (B) A mixture of a polyol, a urethane curing catalyst and an epoxy curing catalyst.

2. The adhesive of claim 1 wherein the isocyanate prepolymer in (A) is one obtained by the reaction of poly (alkylene oxide) diol with an excess on an equivalent basis of a poly isocyanate.

3. The adhesive of claim 2 wherein the poly epoxide of (A) is a compound containing more than one group of the formula:

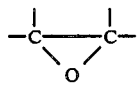

4. The adhesive of claim 3 wherein the polyepoxide in (A) is present in from 2 to 30% by weight based on the weight of the isocyanate prepolymer.

5. The adhesive of claim 4 wherein the urethane catalyst in (B) is one selected from the group consisting of triethylene diamine, N,N', N"-tris (dimethylaminopropyl) hexahydrotriazine, dibutyltin dicarboxylates, stannous octoate and mixtures thereof.

6. The adhesive of claim 5 wherein the epoxy curing catalyst is one selected from the group consisting of tertiary amines, imidazoline, tetra alkyl ammonium halides, titanates, boron trifluoride-amine complexes, lithium chloride, phenolics and mixtures thereof.

7. The adhesive of claim 6 wherein the polyol of (B) is a compound having at least two hydroxyl groups per molecule and having an equivalent weight in the range of from 30 to 5,000.

8. The adhesive of claim 7 wherein the isocyanate prepolymer of (A) is one prepared by the reaction of methylene bis(phenyl isocyanate) with a poly(propylene oxide) diol and the polyepoxide is a diglycidyl ether of Bisphenol-A.

9. The adhesive of claim 7 wherein the polyol of (B) is obtained by reacting an excess of poly(propylene oxide) tetraol with toluene diisocyanate, the urethane catalyst is triethylene diamine and the epoxy curing agent is a boron trifluoride-ethylamine complex.

10. The adhesive of claim 10 wherein (B) also contains methyl trialkyl ammonium chloride epoxy curing catalyst.

11. The process for preparing a laminated structure comprising applying to at least one surface of a first substrate the adhesive of claim 1 and contacting said surface with the surface of a second substrate and allowing said adhesive to cure.

12. The process of claim 11 wherein the substrates are selected from the group consisting of fiber reinforced plastic, metal wood and combinations thereof.

13. The process of claim 12 wherein the substrates are fiberglass reinforced polyester panels.

* * * * *